(12) United States Patent
Shimada et al.

(10) Patent No.: US 10,261,481 B2
(45) Date of Patent: Apr. 16, 2019

(54) CONTROL DEVICE

(71) Applicant: TOYOTA JIDOSHA KABUSHIKI KAISHA, Toyota-shi, Aichi-ken (JP)

(72) Inventors: Masanori Shimada, Susono (JP); Hayato Nakada, Minamitsuru-gun (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 127 days.

(21) Appl. No.: 15/304,624

(22) PCT Filed: May 12, 2015

(86) PCT No.: PCT/JP2015/063628
§ 371 (c)(1),
(2) Date: Oct. 17, 2016

(87) PCT Pub. No.: WO2015/190205
PCT Pub. Date: Dec. 17, 2015

(65) Prior Publication Data
US 2018/0181090 A1      Jun. 28, 2018

(30) Foreign Application Priority Data

Jun. 10, 2014   (JP) ................................. 2014-119775

(51) Int. Cl.
*G05B 13/00*   (2006.01)
*G05B 13/04*   (2006.01)
(Continued)

(52) U.S. Cl.
CPC ......... *G05B 13/048* (2013.01); *B60W 30/16* (2013.01); *B60W 30/17* (2013.01);
(Continued)

(58) Field of Classification Search
CPC combination set(s) only.
See application file for complete search history.

(56) References Cited

U.S. PATENT DOCUMENTS

2003/0217549 A1   11/2003   Watanabe et al.
2005/0060989 A1    3/2005   Kawashima et al.
(Continued)

FOREIGN PATENT DOCUMENTS

JP   2003-254133   9/2003
JP   2004-188996   7/2004
(Continued)

OTHER PUBLICATIONS

JP2012026346A—Nakada; English translation (Year: 2012).*

*Primary Examiner* — Anne M Antonucci
*Assistant Examiner* — Renee LaRose
(74) *Attorney, Agent, or Firm* — Finnegan, Henderson, Farabow, Garrett & Dunner, LLP

(57) ABSTRACT

This control device is configured to, based on a premise that an operating condition of a plant is a specific operating condition that is defined in advance, search for a virtual current value of a controlled variable for ensuring that a specific state quantity does not conflict with a constraint in the future using a prediction model, set the virtual current value which was found by the search to a target value of the controlled variable, and determine a manipulated variable of the plant so that an actual current value of the controlled variable approaches the target value. Due to this configuration, even if the operating condition of the plant suddenly changes to the specific operating condition, the controlled variable of the plant can be adjusted in advance so that the specific state quantity in the specific operating condition does not conflict with the constraint.

9 Claims, 10 Drawing Sheets

(51) Int. Cl.
  *B60W 30/16* (2012.01)
  *F02D 21/08* (2006.01)
  *F02D 23/00* (2006.01)
  *F01N 9/00* (2006.01)
  *F02D 41/08* (2006.01)
  *F02D 41/14* (2006.01)
  *F02D 41/00* (2006.01)
  *F01N 3/021* (2006.01)
  *B60W 30/17* (2012.01)
  *B60W 50/00* (2006.01)
  *F02D 41/04* (2006.01)
  *F02D 41/10* (2006.01)
  *F02D 41/02* (2006.01)

(52) U.S. Cl.
  CPC ......... *B60W 50/0097* (2013.01); *F01N 3/021* (2013.01); *F01N 9/002* (2013.01); *F01N 9/005* (2013.01); *F02D 21/08* (2013.01); *F02D 23/00* (2013.01); *F02D 41/0002* (2013.01); *F02D 41/005* (2013.01); *F02D 41/0007* (2013.01); *F02D 41/0055* (2013.01); *F02D 41/042* (2013.01); *F02D 41/08* (2013.01); *F02D 41/10* (2013.01); *F02D 41/1401* (2013.01); *F02D 41/1402* (2013.01); *F02D 41/1446* (2013.01); *B60W 2050/0014* (2013.01); *B60W 2550/14* (2013.01); *B60W 2550/302* (2013.01); *B60W 2550/308* (2013.01); *B60W 2750/308* (2013.01); *F01N 2900/1602* (2013.01); *F02D 41/029* (2013.01); *F02D 41/0225* (2013.01); *F02D 41/047* (2013.01); *F02D 2041/143* (2013.01); *F02D 2041/1412* (2013.01); *F02D 2200/021* (2013.01); *F02D 2200/04* (2013.01); *F02D 2200/0414* (2013.01); *F02D 2200/0804* (2013.01); *F02D 2200/0812* (2013.01); *F02D 2200/101* (2013.01); *F02D 2200/501* (2013.01); *Y02T 10/20* (2013.01); *Y02T 10/42* (2013.01); *Y02T 10/47* (2013.01)

(56) References Cited

U.S. PATENT DOCUMENTS

| | | | |
|---|---|---|---|
| 2009/0248175 | A1 | 10/2009 | Eguchi et al. |
| 2015/0275771 | A1* | 10/2015 | Pochner .................. F02D 9/02 701/103 |

FOREIGN PATENT DOCUMENTS

| | | | |
|---|---|---|---|
| JP | 4131219 | | 8/2008 |
| JP | 2009-244933 | | 10/2009 |
| JP | 2011-106349 | | 6/2011 |
| JP | 2012026346 | A * | 2/2012 |
| JP | 2012-255405 | | 12/2012 |
| JP | 2013-79637 | | 5/2013 |
| JP | 2013-84091 | | 5/2013 |
| JP | 2013-167203 | | 8/2013 |
| JP | 2013-228589 | | 11/2013 |

\* cited by examiner

CONTROL DEVICE

CROSS-REFERENCE TO RELATED APPLICATIONS

This application is a national phase application of International Application No. PCT/JP2015/063628, filed May 12, 2015, and claims the priority of Japanese Application No. 2014-119775, filed Jun. 10, 2014, the content of both of which is incorporated herein by reference.

FIELD

The present invention relates to a control device that controls a plant in which a constraint is imposed on a state quantity, and more particularly relates to a control device equipped with a function that determines a target value of a controlled variable based on future prediction of a state quantity on which a constraint is imposed. Note that, in the present description, the term "plant" refers to a system that is a control object in control engineering.

BACKGROUND

In control engineering, a reference governor that modifies a target value of a controlled variable based on future prediction of a state quantity on which a constraint is imposed is known. In PTL 1 an example is described in which a reference governor is used in control of an internal combustion engine. A reference governor is designed to predict how a state quantity on which a constraint is imposed will change from the present to the future with respect to a manipulated variable that is determined based on a target value of a controlled variable, based on the premise that the current operating conditions will also continue thereafter.

CITATION LIST

Patent Literature

[PTL 1] JP 2013-079637 A
[PTL 2] JP 2013-084091 A
[PTL 3] JP 2013-228589 A

SUMMARY

Technical Problem

A reference governor can be applied to temperature control of a DPF provided in an after-treatment system of a compression self-ignition internal combustion engine. In the case of applying a reference governor to temperature control of a DPF, a target value of the DPF temperature as a controlled variable is input to a prediction model, and calculation of a future value of the DPF temperature is performed. The validity of the target value of the DPF temperature is then evaluated based on a relation between the future value of the DPF temperature obtained with the prediction model and an upper limit value as a constraint imposed on the DPF temperature, and modification of the target value is performed so as to obtain a higher evaluation.

A reference governor is means for searching for an optimized target value under the current operating conditions. Hence, as long as the current operating conditions continue, the target value can be appropriately modified so that the DPF temperature does not exceed the upper limit value. However, the operating conditions of an internal combustion engine may sometimes change suddenly. Specifically, in some cases the operation of an internal combustion engine suddenly changes to idle operation as a result of the accelerator pedal being released. In such a case, according to the logic for modification of a target value which is applied to the reference governor, there is a concern that no matter which way the target value is modified, it will not be possible to avoid a situation in which the DPF temperature exceeds the upper limit value in the future.

The present invention has been made in consideration of the above described problem, and an object of the present invention is to provide a control device which can adjust a controlled variable of a plant in advance so that a constraint imposed on a state quantity is satisfied, even when an operating condition of the plant suddenly changes.

Solution to Problem

A control device according to the present invention is a control device for a plant in which a constraint is imposed on a specific state quantity, that is equipped with a prediction model of which the inputs include an operating condition and a controlled variable of the plant, and of which the outputs include a future value of the specific state quantity that is predicted based on the inputs. The term "specific state quantity" refers to a state quantity that is particularly specified as an object on which to impose a constraint among numerous state quantities of the plant. The specific state quantity on which a constraint is imposed and the controlled variable may be the same kind of state quantity or may be different kinds of state quantities. An operating condition that is applied to the prediction model is a condition that influences state quantities of the plant including the controlled variable, and in particular is a condition that influences the specific state quantity. As long as the prediction model simulates characteristics of the plant relating to the specific state quantity, the prediction model may be a physical model, a statistical model or a composite model of a physical model and a statistical model. Further, the prediction model may be programmed as a routine or a subroutine to be executed by the control device, may be defined as a function within a routine or a subroutine, or may be defined as a map. That is, the configuration of the prediction model is not limited.

The control device according to the present invention is configured to, based on a premise that an operating condition of a plant is a specific operating condition that is defined in advance, search for a virtual current value of a controlled variable for ensuring that a specific state quantity does not conflict with a constraint in the future using a prediction model. The term "specific operating condition" refers to a specific condition among operating conditions of the plant, and any condition can be set as the specific operating condition as long as the condition is a condition that is defined in advance. However, being a discrete operating condition having no continuity with other operating conditions can be mentioned as a preferable requirement for being the specific operating condition. In addition, as one requirement for the specific operating condition, being an operating condition for which satisfying the constraint is particularly difficult, or being an operating condition for which a particularly high accuracy is required with respect to satisfying the constraint or the like can also be mentioned. A controlled variable is one parameter of a prediction model, and if an actual current value is inputted as the controlled variable, a future value of a specific state quantity that is to be predicted based on the current controlled variable can be calculated.

However, the control device of the present invention inputs a virtual current value of a controlled variable into a prediction model, and not an actual current value thereof, and calculates a future value of a specific state quantity that is to be predicted, based on the virtual current value. If a future value of the specific state quantity that is predicted based on a virtual current value of a given value conflicts with the constraint, the future value of the specific state quantity is predicted based on a virtual current value of a different value. By performing such processing, a virtual current value of the controlled variable for ensuring that the specific state quantity does not conflict with the constraint in the future can be found. Preferably, the control device of the present invention is configured to determine a reference target value of the controlled variable based on current operating conditions of the plant, and to perform a search for a virtual current value based on the reference target value. The control device according to the present invention is configured to set a virtual current value obtained by a search performed by the prediction model as a target value of the controlled variable, and to determine a manipulated variable of the plant so that the actual current value of the controlled variable approaches the target value.

Advantageous Effects of Invention

The control device according to the present invention searches for a virtual current value of a controlled variable for ensuring that a future value of a specific state quantity under a specific operating condition will not conflict with a constraint, and determines a manipulated variable of a plant by adopting the virtual current value as a target value of the controlled variable. By this means, regardless of which operating conditions the current operating conditions of the plant are, the current value of the controlled variable becomes an ideal current value that is suitable for the specific operating condition, or becomes a value that is close to the ideal current value. Therefore, according to the control device of the present invention, even if an operating condition of a plant suddenly changes to a specific operating condition, a situation in which a specific state quantity conflicts with a constraint is avoided.

DESCRIPTION OF EMBODIMENTS

Embodiment 1

Figure 1:
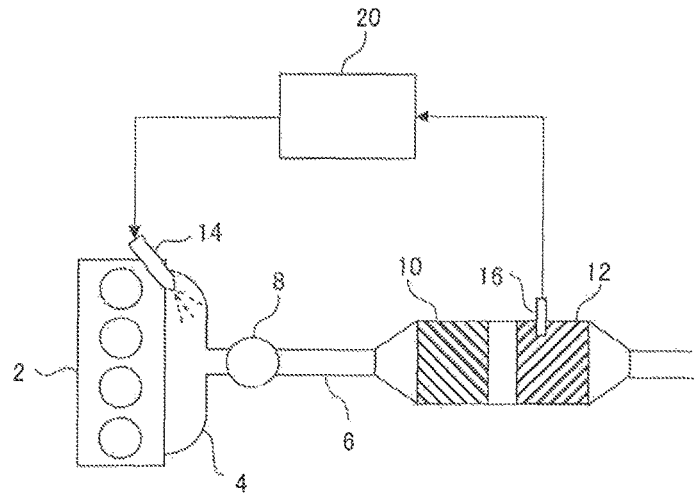
FIG. 1 is a schematic diagram illustrating a configuration of an after-treatment system of an internal combustion engine.
Figure 2:
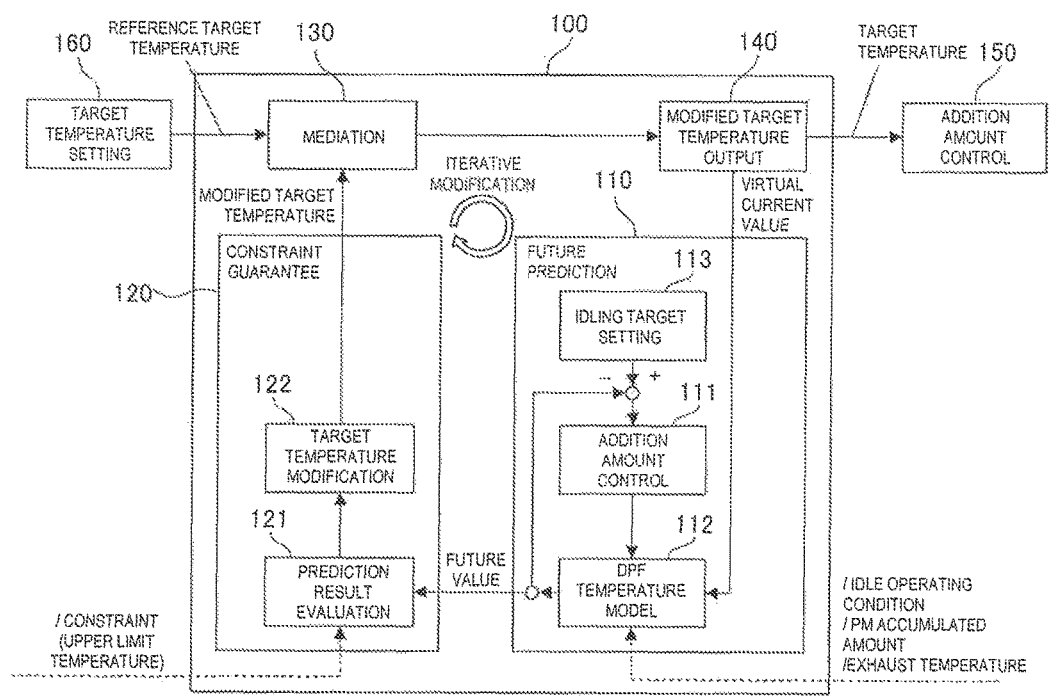
FIG. 2 is a block diagram illustrating a control structure of Embodiment 1 of the present invention.

Hereunder, Embodiment 1 of the present invention will be described using the accompanying drawings.
<Control Object of Embodiment 1>
A control device of Embodiment 1 takes as a control object an internal combustion engine which is mounted in an automobile, more specifically, a compression self-ignition internal combustion engine that is equipped with a DPF. FIG. 1 is a schematic diagram illustrating the configuration of an after-treatment system of an internal combustion engine. The after-treatment system includes a CCO (oxidation catalytic converter) 10 and a DPF (diesel particulate filter) 12 that are provided in series downstream of a turbine 8 in an exhaust passage 6, and also includes a fuel addition valve 14 in an exhaust manifold 4 attached to cylinder heads 2. A temperature sensor 16 for measuring a bed temperature of the DPF 12 is attached to the DPF 12. In the present description, a bed temperature of the DPF 12 that is measured using the temperature sensor 16 is referred to as a "DPF temperature". A signal of the temperature sensor 16 is sent to an ECU (electronic control unit) 20, and an actuation signal is sent from the ECU 20 to the fuel addition valve 14. The control device of Embodiment 1 corresponds to a part of the functions of the ECU 20. The control device of Embodiment 1 performs control of the internal combustion engine by taking the DPF temperature as a controlled variable and taking a fuel addition amount as a manipulated variable. If the DPF temperature rises continuously there is a risk that it will lead to erosion of the DPF 12, and hence a constraint from the viewpoint of reliability is imposed on the DPF temperature. Specifically, an upper limit temperature at which erosion can be prevented and the reliability of the DPF can be ensured is set as a constraint with respect to the DPF temperature. The DPF temperature is a controlled variable and at the same time also corresponds to a specific state quantity on which a constraint is imposed.
<Control Structure of Embodiment 1>
FIG. 2 is a block diagram illustrating a control structure of the control device of Embodiment 1. The control structure illustrated in FIG. 2 includes a target temperature setting unit 160, a target temperature modification unit 100 and an addition amount control unit 150. The target temperature setting unit 160 includes a map in which the DPF temperature is associated with operating conditions of the internal combustion engine. DPF temperatures registered in the map are DPF temperatures that are suited to operating conditions associated therewith. The engine speed and a fuel injection amount are included in the operating conditions which serve as arguments of the map. The target temperature setting unit 160 reads a DPF temperature that corresponds to the current operating conditions from the map, and sets the read DPF temperature as a target value of the DPF temperature (may also be referred to herein as "target DPF temperature" or "target temperature"). The target temperature modification unit 100 modifies the target value of the DPF temperature that is set by the target temperature setting unit 160 so that the DPF temperature does not conflict with the constraint. Specifically, the target temperature modification unit 100 includes a future prediction unit 110, a constraint guarantee unit 120, a mediation unit 130 and a modified target temperature output unit 140. The addition amount control unit 150 performs feedback control of a fuel addition amount based on a target value of the DPF temperature that is modified by the target temperature modification unit 100. Specifically, a correction amount of the fuel addition amount is calculated by PD-controlling or PID-controlling a difference between a target value and a measured value of the DPF temperature. These units that the control device includes correspond to a control program that is stored in a memory of the control device, or to one portion of the control program. The functions of these units are realized by the control device reading out the control program from the memory and executing the control program with a processor.

The target temperature modification unit 100 will now be described in detail. The future prediction unit 110 constituting a part of the target temperature modification unit 100 includes an addition amount control unit 111, a DPF temperature model 112 and an idling target setting unit 113. The idling target setting unit 113 sets a target value of the DPF temperature for an idle state. A favorable DPF temperature is determined according to the engine speed and fuel injection amount, and in an idle state the engine speed and fuel injection amount are controlled to fixed values such that stable rotation of the internal combustion engine can be maintained. Consequently, the target value of the DPF temperature for an idle state is fixed to a predetermined value that is lower than a target value for a non-idle state. The addition amount control unit 111 corresponds to a duplicate of the addition amount control unit 150, and calculates a fuel addition amount based on the target value of the DPF temperature that is set by the idling target setting unit 113. Because the target value of the DPF temperature for an idle state is low, the fuel addition amount that the addition amount control unit 111 calculates is an extremely small amount. The fuel addition amount for an idle state that the addition amount control unit 111 calculates is used in calculation by the DPF temperature model 112 that is described next.

The DPF temperature model 112 is a prediction model which can predict a change in the DPF temperature in the future. In the DPF temperature model 112, the relation between a fuel addition amount as a manipulated variable and the DPF temperature as a specific state quantity on which a constraint is imposed is modelled using a physical model or the like. The operating conditions of the internal combustion engine and the state of the DPF influence the relation between the fuel addition amount and the DPF temperature. Therefore, in the DPF temperature model 112, the engine speed, fuel injection amount and intake air flow rate that are operating conditions of the internal combustion engine are used as parameters. However, operating conditions applied to the DPF temperature model 112 are always fixed to operating conditions in an idle state, regardless of the current operating conditions. That is, an idle speed, an idle injection amount, and an idle intake air flow rate that are fixed values are used as parameters for future prediction. In addition, in the DPF temperature model 112, an accumulated amount of PM, the exhaust gas temperature (exhaust gas temperature at an outlet of the main body of the internal combustion engine), and a current value of the DPF temperature which represents the state of the DPF are also used as parameters. The accumulated amount of PM can be estimated based on the operating history of the internal combustion engine, and the exhaust gas temperature can be estimated based on the operating state of the internal combustion engine or can be directly measured by a sensor. A current value of the PM accumulation amount and a current value of the exhaust gas temperature that were measured or estimated are applied to the DPF temperature model 112. Further, with respect to the current value of the DPF temperature, an actual value can be measured by the temperature sensor 16. However, in the future prediction unit 110, a target value (or modified target value) of the DPF temperature that is received from the modified target temperature output unit 140, and not an actual value measured by the temperature sensor 16, is applied as a virtual current value to the DPF temperature model 112. Based on various parameters including idle operating conditions and the fuel addition amount calculated by the addition amount control unit 111, the DPF temperature model 112 calculates a future value of the DPF temperature over a predetermined prediction horizon, taking the virtual current value of the DPF temperature received from the modified target temperature output unit 140 as an initial value.

The constraint guarantee unit 120 includes a prediction result evaluation unit 121 and a target value modification unit 122. The prediction result evaluation unit 121 performs an evaluation with respect to the future value of the DPF temperature that is calculated by the future prediction unit 110, by checking the future value against the upper limit value of the DPF temperature that is the constraint. As the evaluation method, for example, calculation of a predetermined evaluation function is performed. The evaluation function is designed so that the closer that a future value of the DPF temperature is to the upper limit value that is the constraint without conflicting with the constraint, the higher the evaluation that is given. A specific example of the evaluation function is described later. Based on the evaluation result with respect to the future value of the DPF temperature, the target value modification unit 122 modifies the target value of the DPF temperature so that a higher evaluation is obtained. The target value of the DPF temperature that is modified here is a target value that is used as the virtual current value in the DPF temperature model 112. Hence, modification of the target value by the target value modification unit 122 means modification of the virtual current value of the DPF temperature.

When a target value of the DPF temperature (hereunder, referred to as "reference target value") is input from the target temperature setting unit 160, the mediation unit 130 outputs the reference target value to the modified target temperature output unit 140. Further, when a modified target value of the DPF temperature is input from the constraint guarantee unit 120, the mediation unit 130 outputs the modified target value to the modified target temperature output unit 140 instead of the reference target value. The modified target temperature output unit 140 determines whether or not modification of the target value of the DPF temperature is completed, and outputs the target value or the modified target value of the DPF temperature to the future prediction unit 110 until modification is completed. As mentioned above, the target value or modified target value provided to the future prediction unit 110 from the modified target temperature output unit 140 is used as a virtual current value of the DPF temperature in the DPF temperature model 112.

As described above, the modified target temperature output unit 140, the future prediction unit 110, the constraint guarantee unit 120, and the mediation unit 130 constituting the target temperature modification unit 100 form a loop for iteratively modifying the target value of the DPF temperature (that is, the virtual current value of the DPF temperature). A virtual current value of the DPF temperature that can satisfy the constraint is searched for by performing iterative modification by means of this loop. When modification of the target value of the DPF temperature is completed, the modified target value of the DPF temperature is output from the target temperature modification unit 100 to the addition amount control unit 150. To express this another way, a virtual current value of the DPF temperature that can satisfy the constraint is output as the target value of the DPF temperature to the addition amount control unit 150.

<Control Structure of Comparative Example>

Figure 3:
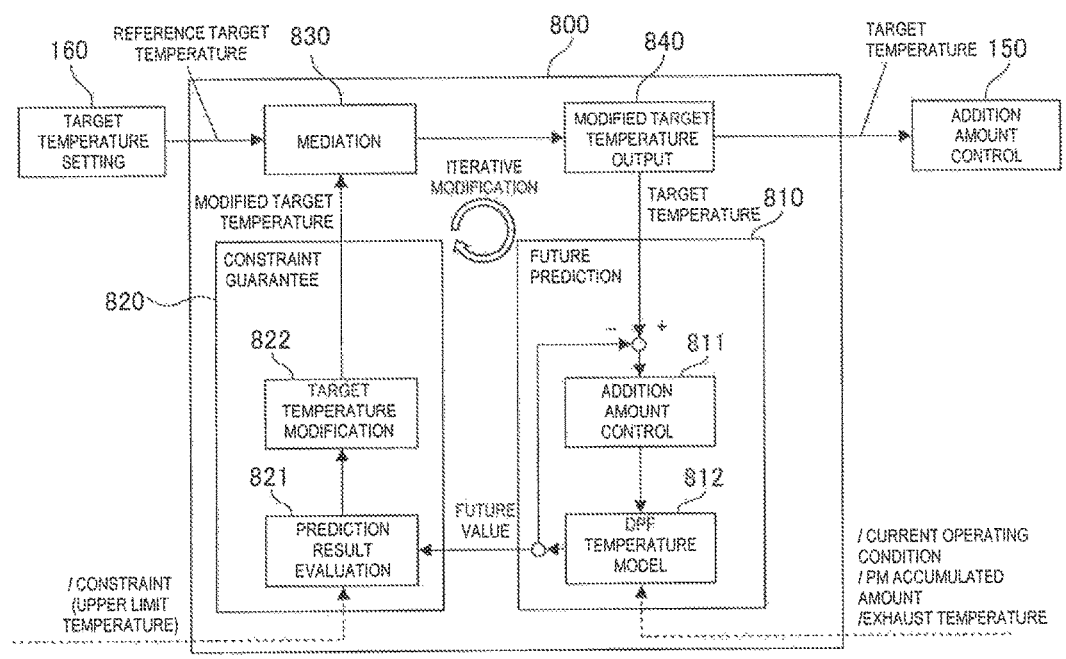
FIG. 3 is a block diagram illustrating a control structure of a comparative example.

Next, to clarify the features of the control device of Embodiment 1 relative to a conventional reference governor, an example of a control structure in which the conventional reference governor is applied will be described as a comparative example. FIG. 3 is a block diagram illustrating the control structure of the comparative example. In the control structure illustrated in FIG. 3, relative to the control structure illustrated in FIG. 2, the target temperature modification unit 100 is replaced with a reference governor 800. Specifically, the reference governor 800 includes a future prediction unit 810, a constraint guarantee unit 820, a mediation unit 830 and a modified target temperature output unit 840. Among these units, the respective functions of the constraint guarantee unit 820, the mediation unit 830, and the modified target temperature output unit 840 are similar to the respective functions of the constraint guarantee unit 120, the mediation unit 130, and the modified target temperature output unit 140 included in the target temperature modification unit 100. That is, the characteristic difference between the target temperature modification unit 100 and the conventional reference governor 800 is the difference between the configurations of the future prediction units 110 and 810.

The future prediction unit 810 constituting a part of the reference governor 800 includes an addition amount control unit 811 and a DPF temperature model 812. The addition amount control unit 811 corresponds to a duplicate of the addition amount control unit 150, and calculates a fuel addition amount based on a target value (or modified target value) of the DPF temperature that is received from the modified target temperature output unit 840. The DPF temperature model 812 has the same configuration as the DPF temperature model 112 of the future prediction unit 110. However, in the reference governor 800, a fuel addition amount that is calculated based on a target value (or modified target value) of the DPF temperature is provided as an input of the DPF temperature model 812. Further, in the reference governor 800, the current operating conditions of the internal combustion engine are used as parameters for future prediction. In addition, in the reference governor 800, a current value of the DPF temperature that is obtained by measurement or estimation is provided as it is to the DPF temperature model 812 as an initial value. The DPF temperature model 812 calculates a future value of the DPF temperature over a predetermined prediction horizon by taking the actual current value of the DPF temperature as an initial value, based on various parameters that include current operating conditions of the internal combustion engine.

As will be understood from a comparison between the control structure illustrated in FIG. 2 and the control structure illustrated in FIG. 3, the fact that the target value of the DPF temperature is modified based on future prediction of the DPF temperature is common between the target temperature modification unit 100 according to Embodiment 1 and the reference governor 800 of the comparative example. However, there is a clear difference between the target temperature modification unit 100 and the reference governor 800 with respect to the modification logic for modifying the target value. On the premise of operation under the current operating conditions of the internal combustion engine, the reference governor 800 performs future prediction of the DPF temperature by taking the actual current value of the DPF temperature as an initial value, and searches for a target value such that a future value of the DPF temperature does not conflict with a constraint. In contrast, on the premise of operation under idle operating conditions which are specific operating conditions that are previously defined, the target temperature modification unit 100 performs future prediction with respect to the DPF temperature by taking a virtual current value of the DPF temperature as an initial value, and searches for a virtual current value such that the DPF temperature does not conflict with a constraint. Hereunder, based on respective calculation examples for the reference governor 800 and the target temperature modification unit 100, a problem with the control structure of the comparative example and the advantages of the control structure of the control device of Embodiment 1 with respect to that problem are described.

<Example of Calculation by Control Structure of Comparative Example>

Figure 4:
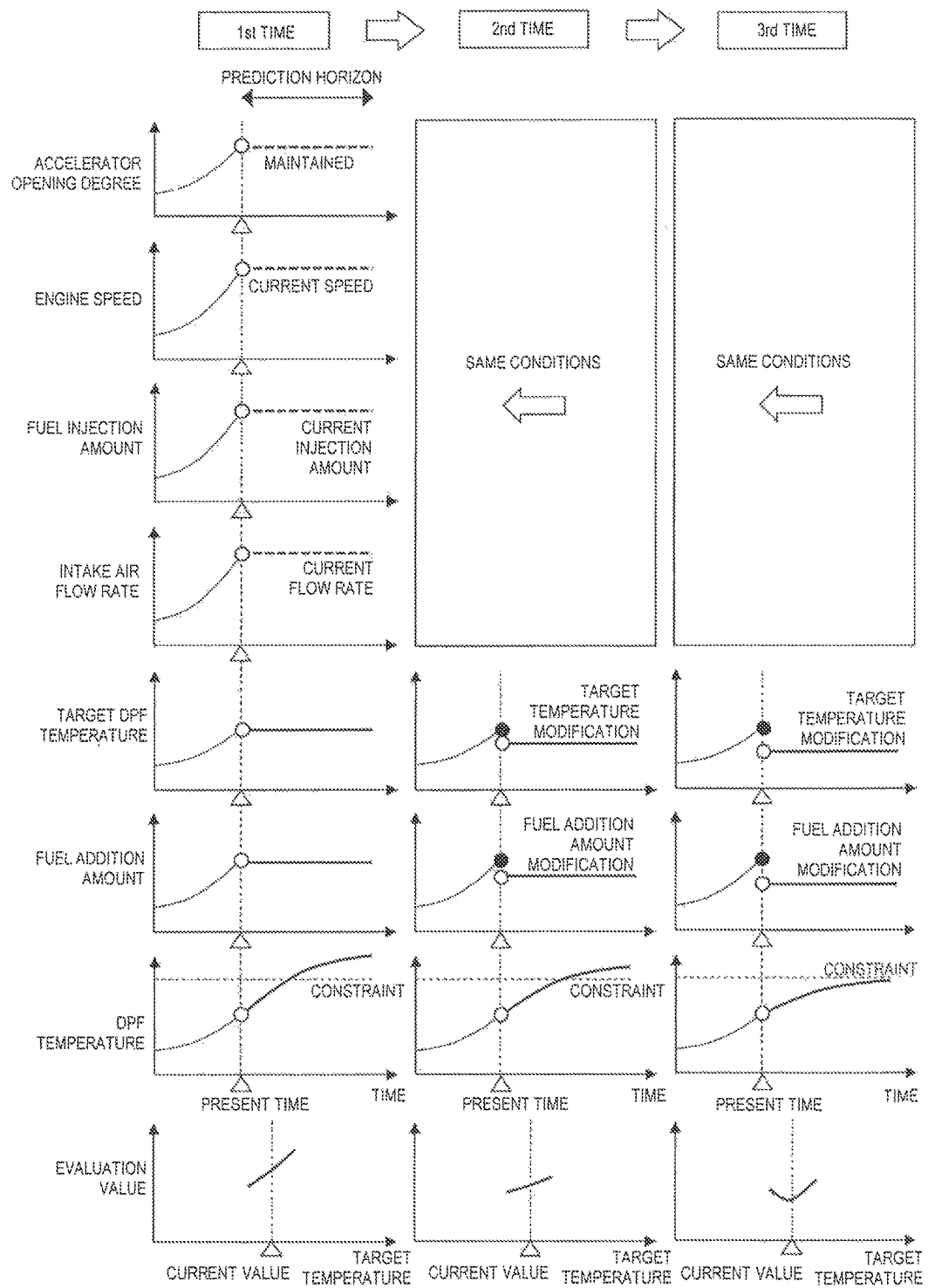
FIG. 4 is a view illustrating an example of a calculation by the control structure of the comparative example.

FIG. 4 is a view illustrating an example of a calculation by the reference governor 800. In FIG. 4, an accelerator opening degree, an engine speed, a fuel injection amount and an intake air flow rate which are operating conditions of the internal combustion engine, a DPF temperature target value as a target value of a controlled variable, a fuel addition amount as a manipulated variable, and a DPF temperature as a state quantity on which a constraint is imposed are respectively shown in graphs, with the time axis represented by the abscissa axis. Further, the relation between a target temperature and an evaluation value of an evaluation function is shown by a graph. In the respective graphs showing the operating conditions, past values for a period prior to the present time are actual values, and future values from the present time are assumed values for future prediction of the DPF temperature. As shown in these graphs, future prediction by the reference governor 800 is performed on the premise that the current operating conditions will continue thereafter also. The reference governor 800 predicts changes in the DPF temperature from the present to the future by taking the actual current value of the DPF temperature as an initial value.

An evaluation value obtained by the evaluation function converges to the vicinity of the minimum value at a time that a predicted value of the DPF temperature no longer conflicts with the constraint. In a case where the evaluation value has not fallen to the minimum value, the reference governor 800 modifies the target value of the DPF temperature downward and modifies the fuel addition amount downward. The reference governor 800 then performs future prediction of the DPF temperature once more based on the modified fuel addition amount, taking the current value of the DPF temperature as an initial value. The future value of the DPF temperature decreases as a result of the fuel addition amount being reduced. However, if the evaluation value has not fallen as far as the minimum value, downward modification of the target value of the DPF temperature and downward modification of the fuel addition amount are performed again.

By modifying the target value of the DPF temperature by repeating the above processing, eventually the future value of the DPF temperature satisfies the constraint and the evaluation value converges to the vicinity of the minimum value. FIG. 4 illustrates an example in which the future value converges as a result of repeating the processing three times. Modification of the target value of the DPF temperature is completed as a result, and the reference governor 800 outputs the target value of the DPF temperature for which modification has been completed. Subsequently, when operating conditions of the internal combustion engine changes in a case where the engine speed increases or the like, future prediction is performed based on new operating conditions, and optimization of the target value of the DPF temperature is performed based on the new operating conditions. That is, according to the reference governor 800, a target value of the DPF temperature for which a future value of the DPF temperature does not conflict with the constraint can be obtained in correspondence with changes in the operating conditions of the internal combustion engine.

However, when the operating state of the internal combustion engine suddenly changes to an idle state, while on one hand the quantity of heat that is carried out from the DPF rapidly decreases due to a decrease in the exhaust gas flow rate, on the other hand, at the DPF, a quantity of heat proportional to the accumulated amount of PM continues to be generated due to combustion of PM. Consequently, the DPF temperature rises rapidly immediately after the operating state of the internal combustion engine suddenly changes to an idle state. That is, the internal combustion engine being in an idle state is the worst condition with regard to the relation with the constraint imposed on the DPF temperature (is an operating condition under which it is particularly difficult to satisfy the constraint). In order to suppress a rapid increase in the DPF temperature under this worst condition, according to the reference governor 800, the target value of the DPF temperature is modified downward and the fuel addition amount is reduced in accordance with the operating conditions in the idle state.

However, since the fuel addition amount in the idle state is originally extremely small, regardless of how much the target value of the DPF temperature is decreased, the future value of the DPF temperature that is predicted cannot be lowered. That is, according to the logic for modifying the target value that is applied to the reference governor 800, in a case where the operating state of the internal combustion engine suddenly changes rapidly to an idle state, there is a risk that, irrespective of how much the target value of the DPF temperature is modified, it will not be possible to satisfy the constraint imposed on the DPF temperature.

With regard to this problem, during the process of creating the present invention, studies were conducted with respect to performing future prediction by means of the reference governor 800 on the premise of the operating conditions in an idle state so as to be able to appropriately respond to even a situation in which the operating state of the internal combustion engine changes suddenly to an idle state in the next moment. This future prediction is described hereunder referring to a calculation example illustrated in FIG. 5.

Figure 5:
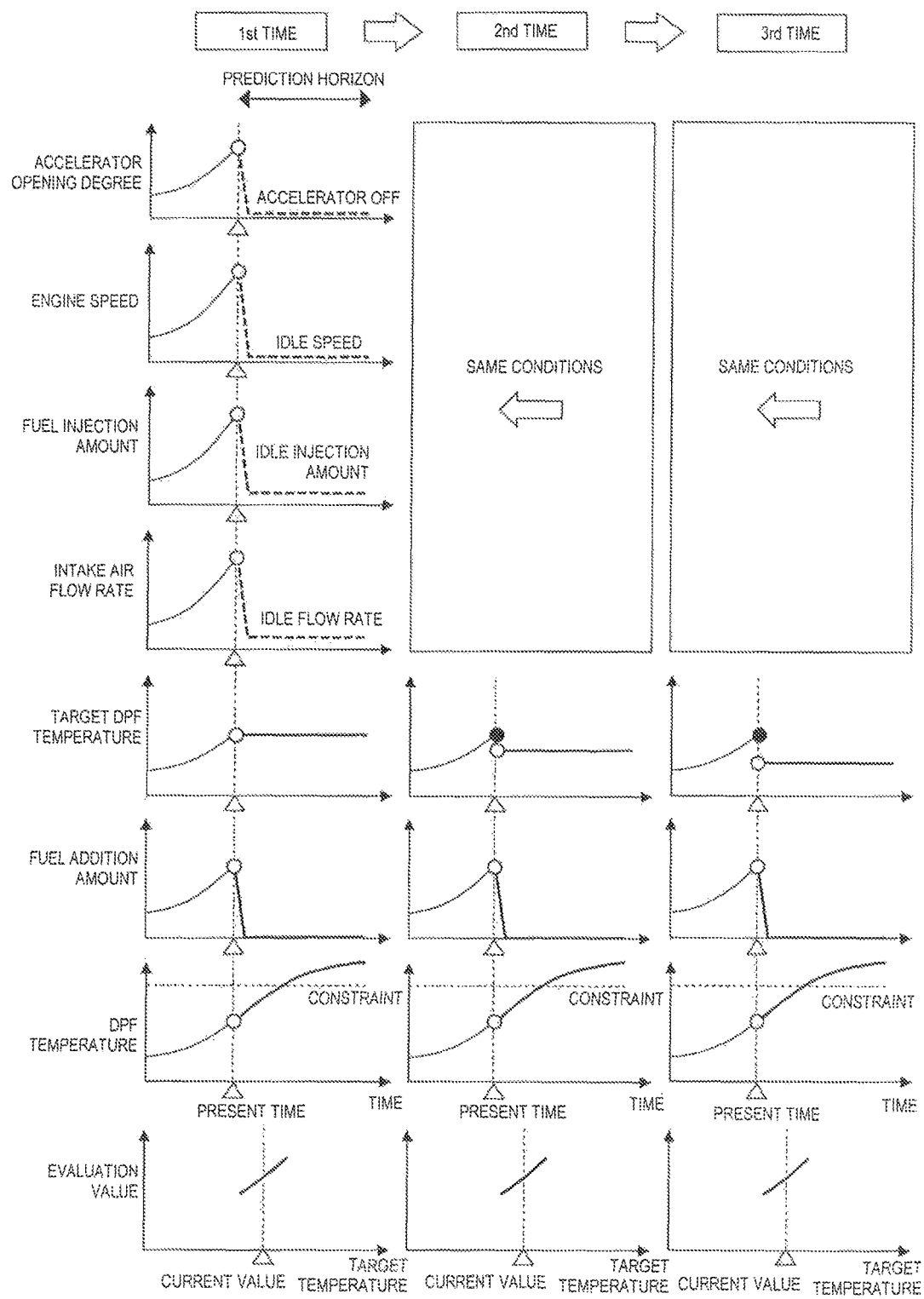
FIG. 5 is a view illustrating another example of a calculation by the control structure of the comparative example.

Although in the example illustrated in FIG. 4 the reference governor 800 performs future prediction on the premise that the current operating conditions will continue thereafter also, in the example illustrated in FIG. 5 the reference governor 800 performs future prediction on the premise that the operating state of the internal combustion engine will suddenly change to an idle state in the next step. In an idle state, the fuel addition amount is lowered to a predetermined minimum value or addition of fuel is itself stopped. Hence, the reference governor 800 predicts a change in the DPF temperature from the present to the future at a time that the fuel addition amount is made a minimum value or zero, taking the current value of the DPF temperature as an initial value. If it is determined as a result of evaluating the predicted DPF temperature that the evaluation value has not decreased as far as the minimum value (that is, if the predicted value of the DPF temperature conflicts with the constraint), the reference governor 800 modifies the target value of the DPF temperature downward. However, since the fuel addition amount has already been made the minimum value or zero, the prediction result for the DPF temperature does not change from the previous time. Therefore, the evaluation value does not decrease to the minimum value, and the reference governor 800 modifies the target value of the DPF temperature further downward. Although this processing is repeatedly performed and the target value of the DPF temperature is steadily lowered, there is no change in the prediction result for the DPF temperature. That is, the situation that the predicted value of the DPF temperature conflicts with the constraint still remains. Although in the example illustrated in FIG. 5 the processing is repeated three times, the result will be the same irrespective of how many times the processing is repeated.

As described above, according to the control structure of the comparative example, when the operating state of the internal combustion engine suddenly changes to an idle state, it is difficult to prevent the DPF temperature from conflicting with a constraint imposed thereon.

<Calculation Example According to Control Structure of Embodiment 1>

Figure 6:
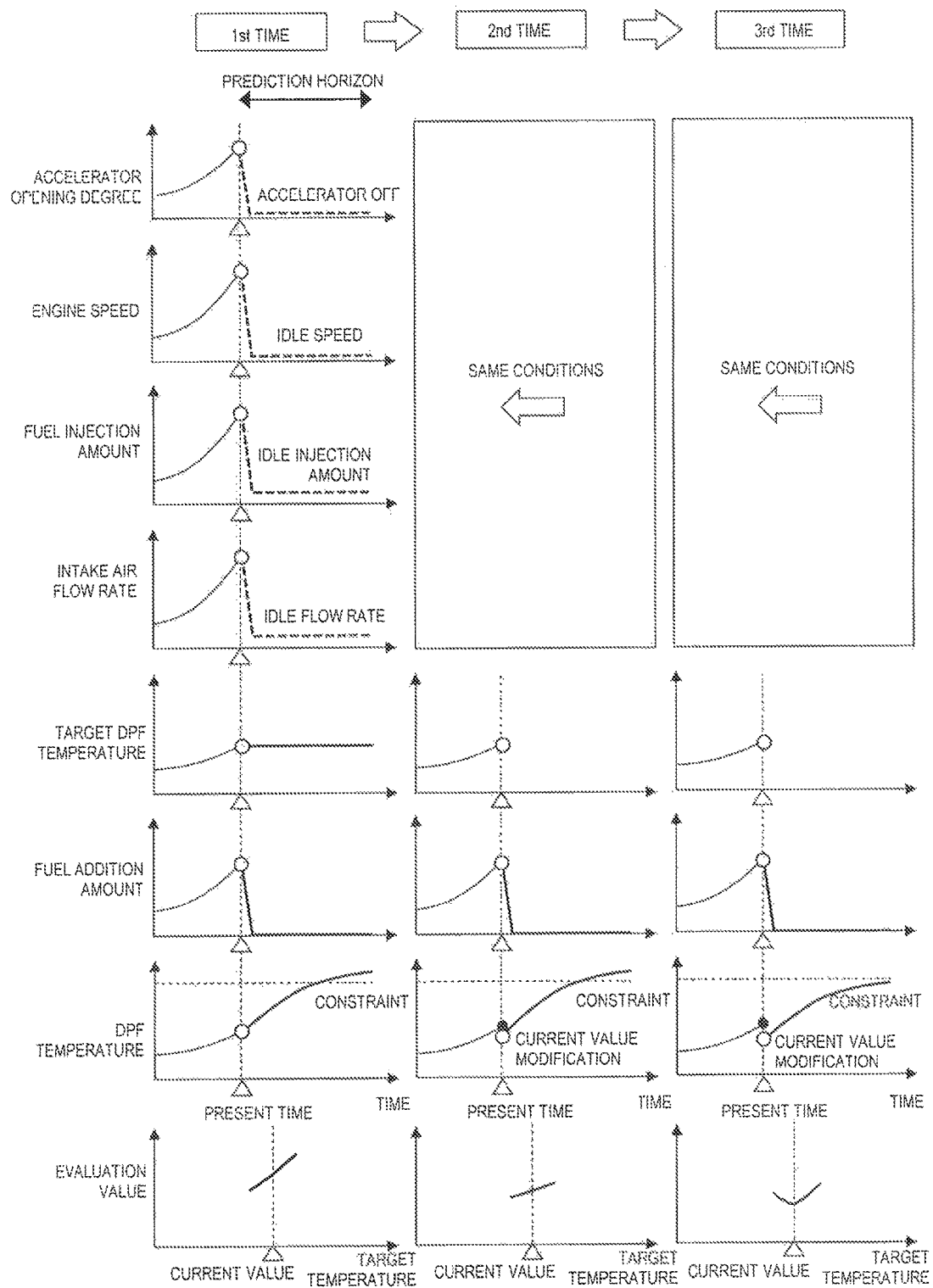
FIG. 6 is a view illustrating an example of a calculation by the control structure of Embodiment 1 of the present invention.

Next, an example of calculation by the target temperature modification unit 100 will be described referring to FIG. 6. Similarly to FIG. 4 and FIG. 5, FIG. 6 illustrates respective graphs for various operating conditions of an internal combustion engine, a DPF temperature target value, a fuel addition amount and a DPF temperature, as well as graphs illustrating the relation between a target temperature and an evaluation value. In the respective graphs illustrating the operating conditions, past values for a period prior to the present time are actual values, and future values from the present time are assumed values for future prediction of the DPF temperature. Future prediction of the DPF temperature by the target temperature modification unit 100 is performed on the premise of operation under operating conditions when the internal combustion engine is in an idle state, that is, an idle speed, an idle injection amount and an idle intake air flow rate, based on the assumption that the accelerator pedal will be released in the next moment and the operating state of the internal combustion engine will suddenly change to an idle state.

When performing the first future prediction, the target temperature modification unit 100 takes the current target value of the DPF temperature as a virtual current value of the DPF temperature. By the action of feedback control, the actual value of the DPF temperature matches the target value or becomes a value that is close thereto. Consequently, in the example shown in FIG. 6, the virtual current value of the DPF temperature in the first future prediction matches the actual current value of the DPF temperature. The target temperature modification unit 100 predicts a change in the DPF temperature from the present to the future by means of the DPF temperature model 112, taking the virtual current value of the DPF temperature as the initial value. In the graph representing the DPF temperature, past values for a period prior to the present time are actual values, and future values from the present time are future values that are predicted by the DPF temperature model 112. Note that, although not illustrated in the graphs, when performing future prediction, a target value of the DPF temperature that is used to calculate the fuel addition amount is taken to be a fixed value that is previously set (a target value for an idle state). Thereby, the fuel addition amount that is used for the future prediction becomes a minimum value or zero. In the example illustrated in FIG. 6, the fuel addition amount in the prediction interval is taken as zero.

The target temperature modification unit 100 inputs the future value of the DPF temperature and an upper limit value thereof as the constraint into the evaluation function and calculates an evaluation value. In the example illustrated in FIG. 6, in the first future prediction the evaluation value does not fall as far as the minimum value. Therefore, for the second future prediction, the target temperature modification unit 100 modifies the virtual current value of the DPF temperature downward. The target temperature modification unit 100 then performs future prediction of the DPF temperature once more taking the virtual current value of the DPF temperature that was modified downward as the initial value. The future value of the DPF temperature that is predicted decreases as a result of the initial value that is used for the future prediction being lowered. However, when the evaluation value has not decreased as far as the minimum value, downward modification of the virtual current value of the DPF temperature is performed once more.

By repeating the above processing and thereby modifying the virtual current value of the DPF temperature that is used as the initial value for the future prediction, eventually the future value of the DPF temperature satisfies the constraint and the evaluation value converges to the vicinity of the minimum value. FIG. 6 illustrates an example in which the future value converges by repeating the processing three times. Modification of the virtual current value of the DPF temperature is completed as a result, and the target temperature modification unit 100 outputs the virtual current value for which modification has been completed to the addition amount control unit 150 as the target value of the DPF temperature (modified target value).

As will be understood from the above calculation example, the target temperature modification unit 100 searches for a virtual current value of the DPF temperature which is a value such that a future value of the DPF temperature does not conflict with the constraint in an idle state, that is, searches for an ideal current value of the DPF temperature, and modifies the target value of the DPF temperature to the ideal current value. Since the addition amount control unit 150 performs feedback control on the fuel addition amount based on the modified target value of the DPF temperature, the current value of the DPF temperature becomes the ideal current value that is suited to idle operating conditions or is held at a value that is close to the ideal current value. Therefore, according to the control device of Embodiment 1 that is equipped with the target temperature modification unit 100, even if the operating state of the internal combustion engine suddenly changes rapidly to an idle state, a situation in which the DPF temperature conflicts with the constraint is avoided.

<Algorithm According to Control Structure of Embodiment 1>

Lastly, a specific example of an algorithm of the control structure of Embodiment 1 will be described using a flowchart shown in FIG. 7.

Figure 7:
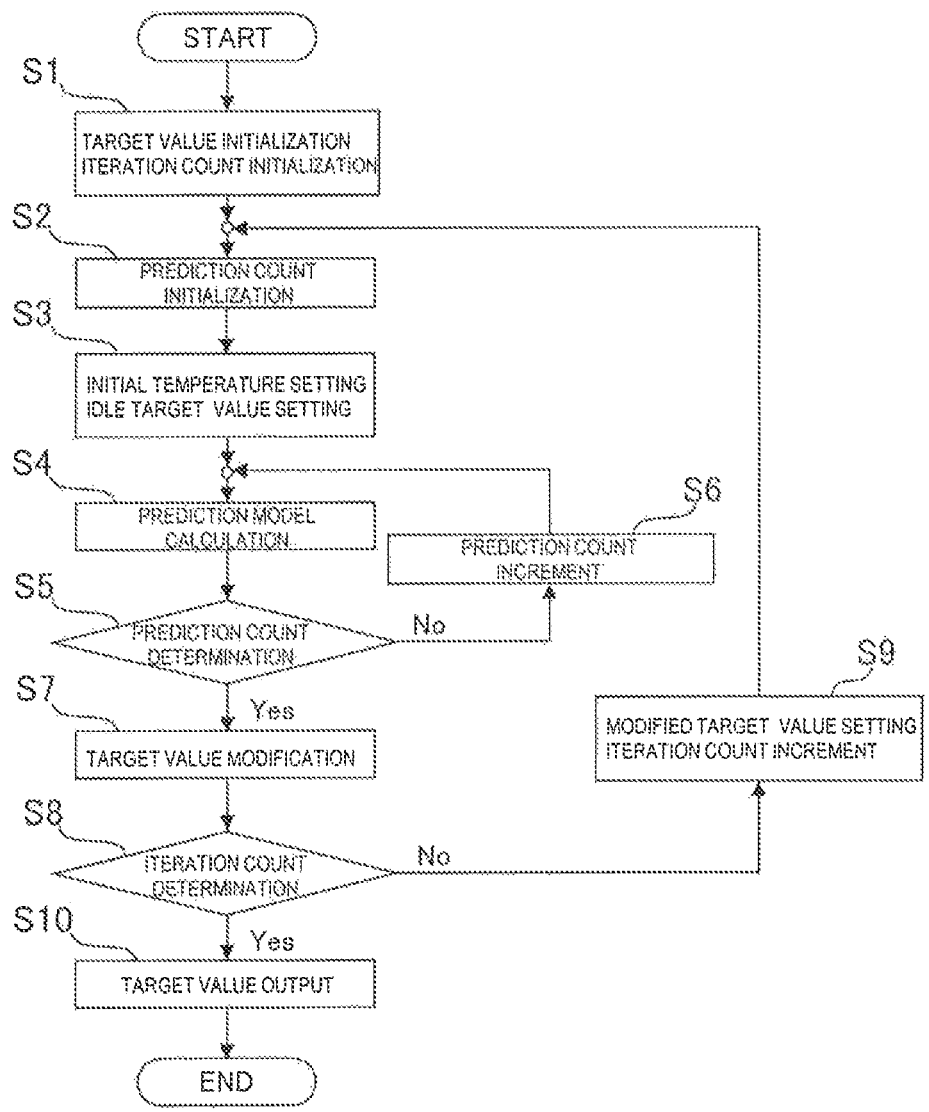
FIG. 7 is a flowchart showing an algorithm of the control structure of Embodiment 1 of the present invention.

The algorithm illustrated in the flowchart in FIG. 7 is repeatedly executed for each sampling time period of feedback control that the control device performs. In step S1, a target value of the DPF temperature is initialized. This processing is performed by the target temperature setting unit 160. The target temperature setting unit 160 determines an initial value of the target value Ttrg_ini, that is, a reference target value, using a map in which the engine speed and the fuel injection amount are adopted as arguments. Further, in step S1, the number of times that modification of the target value is iteratively performed (iteration count) j is initialized to an initial value of 1. The present processing and the processing from step S2 onward are performed by the target temperature modification unit 100. Note that, hereunder, a modified target value with respect to the iteration count j, is represented by "Trg_mod(j)".

In step S2, a prediction count i of the DPF temperature using the DPF temperature model 112 is initialized to an initial value of 1. Note that, the prediction count i refers to discrete time points corresponding to a prediction cycle, and a time period from a discrete time point corresponding to i=0 to a discrete time point corresponding to i=Pend is the prediction interval. The term "Pend" corresponds to the final discrete time point of the prediction interval, and is a set value of the number of iteration of calculation by the DPF temperature model 112.

In step S3, setting of the virtual current value of the DPF temperature, that is, the initial value of the DPF temperature at i=0 is performed. When a future value of the DPF temperature with respect to which the iteration count is the $j^{th}$ time and the prediction count is the is time is taken as T(j,i), when j=1 the reference target value Ttrg_ini is set to a virtual current value of the DPF temperature T(j,0), and when j≠1 the modified target value Ttrg_mod (j) is set to a virtual current value of the DPF temperature T (j,0). Further, in step S3, setting of an idling target value (target value of the DPF temperature in an idle state) is performed.

Figure 8:
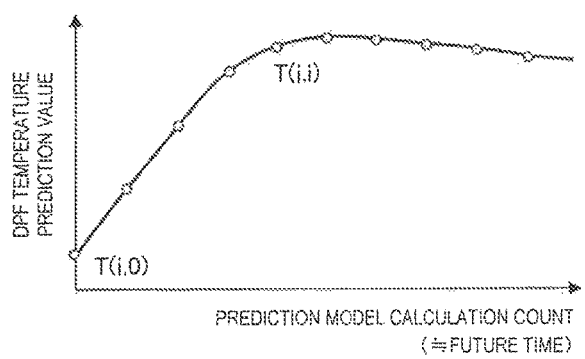
FIG. 8 is a view illustrating prediction model calculation processing.

In step S4, prediction model calculation, that is, calculation of a predicted value of the DPF temperature using the DPF temperature model 112 is performed. According to the prediction model calculation, a future value T(j,i) of the DPF temperature for the prediction count i is calculated using the DPF temperature model 112, based on the virtual current value of the DPF temperature T(j,0) and the idling target value set in step S3 and various operating conditions in the idle state. Note that, an interval between the discrete time points of the DPF temperature model 112, that is, the prediction cycle, can be arbitrarily set. FIG. 8 is a view illustrating an image of the prediction model calculation processing, which shows a situation in which a future value of the DPF temperature is calculated for each discrete time point.

In step S5, it is determined whether or not the prediction count i has reached the set number of times Pend.

If the prediction count i is less than the set number of times Pend, the processing proceeds to step S6. In step S6, the prediction count i is incremented. The processing then proceeds again to step S4 in which the future value T(j,i) of the DPF temperature for the current prediction count i is calculated using the DPF temperature model 112. The processing from step S4 to S6 is repeatedly executed until the prediction count i reaches the set number of times Pend.

Upon the prediction count i reaching the set number of times Pend, the processing proceeds to step S7.

In step S7, calculation of an evaluation value J(j) of the current modified target value Ttrg_mod(j) is performed using a previously defined evaluation function. The most desirable value for the evaluation value J(j) is zero, and the larger that the evaluation value JO) becomes, the lower the evaluation of the modified target value Ttrg_mod(j) is. The evaluation function that gives the evaluation value J(j) is represented specifically by the following equation. In the equation, "Tlimit" represents an upper limit value of the DPF temperature that is set as the constraint, and "Max(T (j,i))" represents a maximum value of the future value T(j,i) of the DPF temperature in the prediction interval.

$$J(j)=|Max(T(j,i))-Tlimit|$$

In step S7, target value modification processing, that is, modification of a target value Ttrg_fin(k) that should be ultimately output at a discrete time point k is also performed based on an evaluation result obtained with respect to the evaluation value J(j). For example, a correction amount is determined according to the size of the evaluation value J(j) that is calculated the current time, and if the maximum value Max(T(j,i)) is greater than the upper limit value Tlimit, the target value Ttrg_fin(k) is modified upward by an amount corresponding to the correction amount, while if the maximum value Max(T(j,i)) is equal to or less than the upper limit value Tlimit, the target value Ttrg_fin(k) is modified downward by an amount corresponding to the correction amount.

In step S8, it is determined whether or not the iteration count j has reached a scheduled iteration count Lend that is set in advance.

If the iteration count j is less than the scheduled iteration count Lend, the processing proceeds to step S9. In step S9, the target value Ttrg_fin(k) that was updated in step S7 is set as a modified target value Ttrg_mod(j+1) for the next iteration count j+1. Further, in step S9, after updating of the modified target value has been performed, the iteration count j is incremented. The processing then proceeds again to step S2 in which the prediction count i of the DPF temperature that is the number of times of prediction using the DPF temperature model 112 is initialized to an initial value of 1. The processing in steps S2 to S9 is then repeatedly executed until the iteration count j reaches the scheduled iteration count Lend. By repeating this processing, a target value Ttrg_fin(k) is searched for that is the closest value to the reference target value Ttrg_ini which also satisfies the constraint.

When the iteration count j reaches the scheduled iteration count Lend, the processing proceeds to step S10. In step S10, the target value Ttrg_fin(k) that was modified in step S7 is formally determined to be the final target value and is output to the addition amount control unit 150.

<Modification Example of Control Structure of Embodiment 1>

Figure 9:
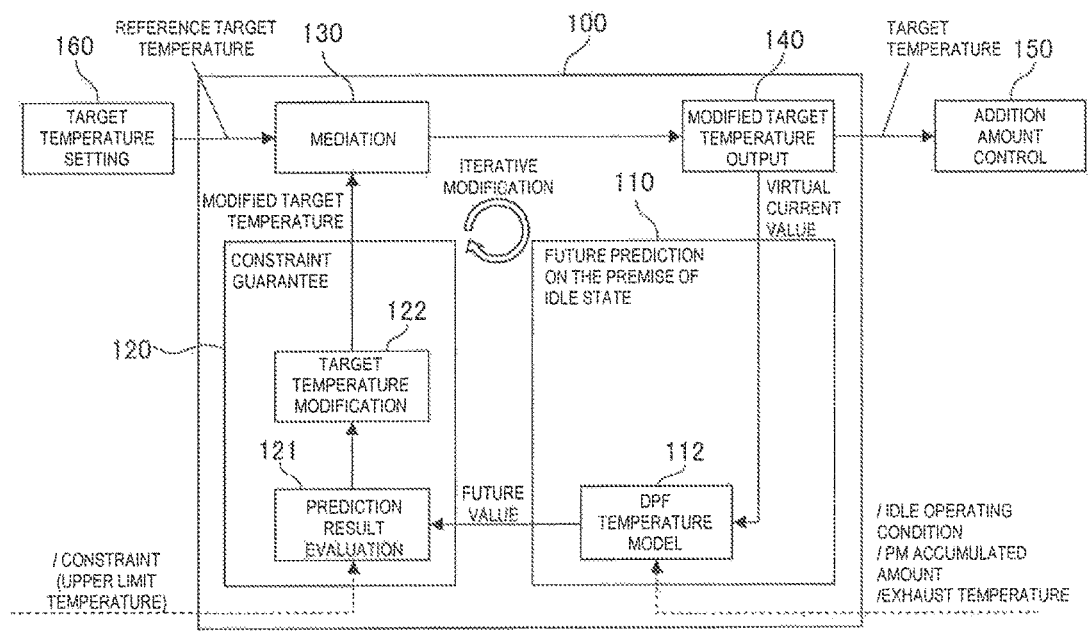
FIG. 9 is a block diagram illustrating a modification example of the control structure of Embodiment 1 of the present invention.

The control structure of Embodiment 1 may be modified as illustrated in FIG. 9. In the control structure illustrated in FIG. 9, relative to the control structure illustrated in FIG. 2, the addition amount control unit 111 and the idling target setting unit 113 are omitted. As mentioned in the foregoing, a fuel addition amount that is set at a time that the operating state of the internal combustion engine has suddenly changed to an idle state is extremely small, and an increase in the DPF temperature is caused by combustion of accumulated PM. Hence, calculation by the DPF temperature model 112 can be performed while taking the fuel addition amount as zero. Note that, although in Embodiment 1 the fuel addition amount is adopted as a manipulated variable, a fuel injection amount that is injected during an exhaust stroke by an in-cylinder injector (an exhaust stroke injection amount) can also be used as a manipulated variable.

<Modification Example of Constraint in Embodiment 1>

In addition to a constraint with respect to the DPF temperature, or instead of a constraint with respect to the DPF temperature, a constraint may be imposed on a state quantity such as a HC purification rate, a CCO temperature, a temperature gradient within the DPF or CCO, or a time rate of change in the DPF temperature or CCO temperature. That is, a specific state quantity on which a constraint is imposed may be a state quantity other than the DPF temperature as a controlled variable. By extending or changing the prediction model, future values of these state quantities can also be predicted based on the virtual current value of the DPF temperature.

Embodiment 2

Next, Embodiment 2 of the present invention will be described using the drawings.

<Control Object of Embodiment 2>

A control device of Embodiment 2 is a control device that takes an internal combustion engine equipped with an EGR system as a control object. The EGR system includes at least an EGR passage that connects an exhaust passage and an intake passage, and an EGR valve provided in the EGR passage. An EGR cooler or an EGR catalyst may also be provided in the EGR passage. The internal combustion engine may be a spark-ignition internal combustion engine or may be a compression self-ignition internal combustion engine. The control device of Embodiment 2 performs control of the internal combustion engine that takes the EGR rate as a controlled variable and the EGR valve opening degree as a manipulated variable. Further, in the internal combustion engine equipped with an EGR system, if the internal combustion engine is stopped in a state in which a large amount of EGR gas remains, condensed water which includes an acidic component will be generated inside the cylinders. In particular, in a case where the internal combustion engine stops during the process of warming up, condensed water adheres to different sites to those in a case where the internal combustion engine stops after warming up, and there is a risk that such condensed water will damage functional parts (for example, a piston ring, a cylinder liner or a valve seat) of the internal combustion engine. Therefore, in Embodiment 2, a constraint from a reliability viewpoint is imposed on the amount of condensed water generated in a cylinder. Specifically, an upper limit value of a condensed water amount that does not affect functional parts is set as a constraint with respect to the condensed water amount. That is, in Embodiment 2, the amount of condensed water generated in cylinders corresponds to a specific state quantity on which a constraint is imposed. Further, in Embodiment 2, an operating condition when the internal combustion engine is in a stopped state corresponds to a specific operating condition.

<Control Structure of Embodiment 2>

Figure 10:
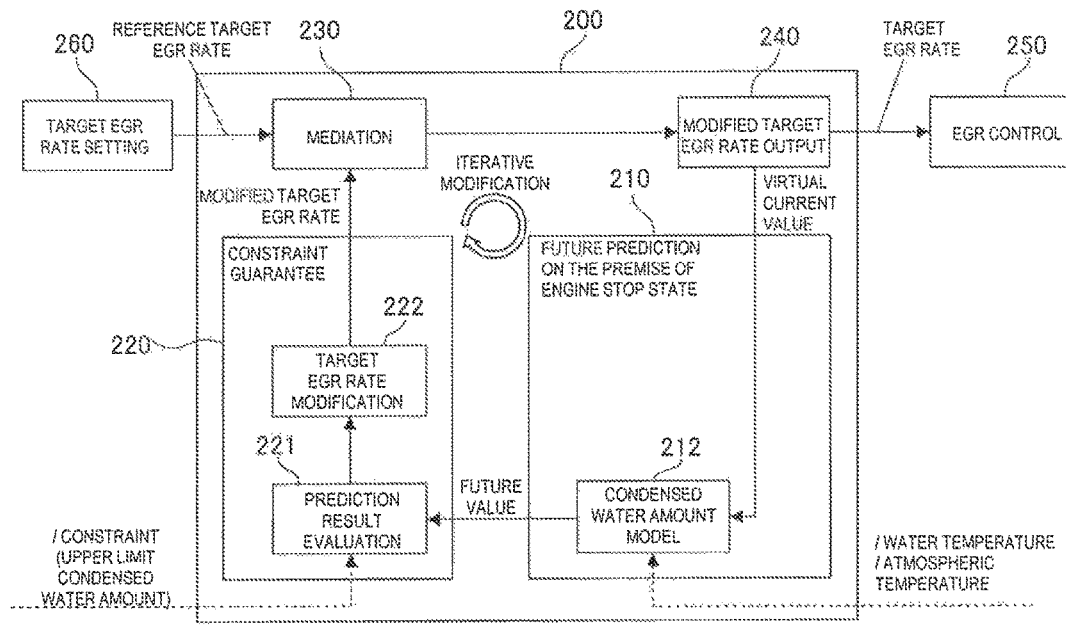
FIG. 10 is a block diagram illustrating a control structure of Embodiment 2 of the present invention.

FIG. 10 is a block diagram that illustrates the control structure of the control device of Embodiment 2. The control structure shown in FIG. 10 includes a target EGR rate setting unit 260, a target EGR rate modification unit 200, and an EGR control unit 250. The target EGR rate setting unit 260 sets a target value of the EGR rate based on operating conditions such as an intake air amount and the engine speed. The target EGR rate modification unit 200 modifies the target value of the EGR rate that is set by the target EGR rate setting unit 260, so that the condensed water amount does not conflict with the constraint. Specifically, the target EGR rate modification unit 200 includes a future prediction unit 210, a constraint guarantee unit 220, a mediation unit 230 and a modified target EGR rate output unit 240. The EGR control unit 250 controls the EGR valve based on the target value of the EGR rate that was modified by the target EGR rate modification unit 200, so that the actual EGR rate becomes the target value. These units that the control device includes correspond to a control program that is stored in a memory of the control device, or to one portion of the control program. The functions of these units are realized by the control device reading out the control program from the memory and executing the control program with a processor.

The details of the target EGR rate modification unit 200 will now be described. The future prediction unit 210 that constitutes a part of the target EGR rate modification unit 200 includes a condensed water amount model 212. The condensed water amount model 212 is a model in which the relation between an EGR rate of in-cylinder gas and the amount of condensed water that arises in cylinders is modelled using a physical model or the like. In addition to the operating state of the internal combustion engine, the water temperature of cooling water and the atmospheric temperature also influence the relation between the EGR rate and the condensed water amount. Consequently, in the condensed water amount model 212, on the premise that the internal combustion engine is stopped, the water temperature and atmospheric temperature are used as parameters. When the internal combustion engine is in a stopped state, the operating conditions are particularly difficult in terms of satisfying the constraint imposed on the condensed water amount. The EGR rate of in-cylinder gas can be estimated based on various parameters of the internal combustion engine. However, the future prediction unit 210 receives a target value (or a modified target value) of the EGR rate from the modified target EGR rate output unit 240, and applies the target value (or modified target value) to the condensed water amount model 212 as a virtual current value of the EGR rate. On the premise that the internal combustion engine is stopped, the condensed water amount model 212 calculates a future value of the condensed water amount over a predetermined prediction horizon based on various parameters that include the virtual current value of the EGR rate.

The constraint guarantee unit 220 includes a prediction result evaluation unit 221 and a target value modification unit 222. The prediction result evaluation unit 221 performs an evaluation with respect to the future value of the condensed water amount that is calculated by the future prediction unit 210, by checking the future value against the upper limit value of the condensed water amount that is the constraint. Based on the evaluation result with respect to the future value of the condensed water amount, the target value modification unit 222 modifies the target value of the EGR rate so that a higher evaluation is obtained. In this case, the target value of the EGR rate that is modified is a target value that is used as the virtual current value of the EGR rate in the condensed water amount model 212. Hence, modification of the target value by the target value modification unit 222 means modification of the virtual current value of the EGR rate.

When a target value of the EGR rate (hereunder, referred to as "reference target value") is input from the target EGR rate setting unit 260, the mediation unit 230 outputs the reference target value to the modified target EGR rate output unit 240. Further, when a modified target value of the EGR rate is input from the constraint guarantee unit 220, the mediation unit 230 outputs the modified target value to the modified target EGR rate output unit 240 instead of the reference target value. The modified target EGR rate output unit 240 determines whether or not modification of the target value of the EGR rate is completed, and outputs the target value or the modified target value of the EGR rate as the virtual current value of the EGR rate to the future prediction unit 210 until modification is completed.

The target EGR rate modification unit 200 iteratively modifies the target EGR rate by calculating the loop formed by the modified target EGR rate output unit 240, the future prediction unit 210, the constraint guarantee unit 220 and the mediation unit 230, and thereby searches for a virtual current value of the EGR rate at which the constraint imposed on the condensed water amount can be satisfied. Subsequently, a virtual current value of the EGR rate at which the constraint imposed on the condensed water amount can be satisfied is output as a target value of the EGR rate from the target EGR rate modification unit 200 to the EGR control unit 250.

<Example of Calculation by Control Structure of Embodiment 2>

Figure 11:
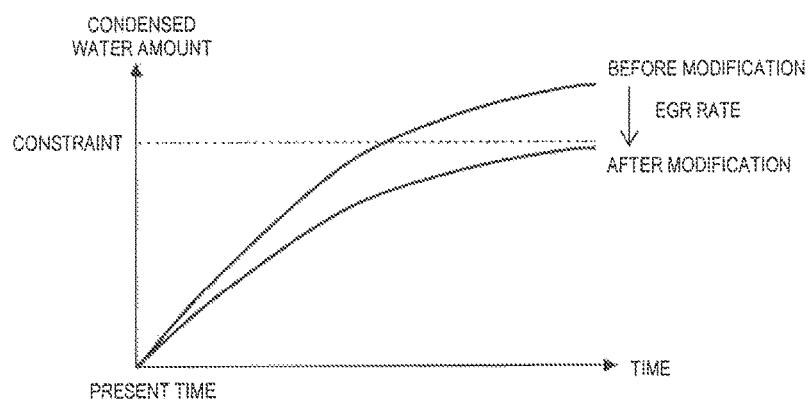
FIG. 11 is a view illustrating an example of a calculation by the control structure of Embodiment 2 of the present invention.

FIG. 11 illustrates a graph in which, taking the time axis as the abscissa axis, future values of the condensed water amount that are predicted using the condensed water amount model 212 are shown. In this graph, a curve (curve denoted by "before modification") that illustrates changes in the future value of the condensed water amount in a case where the reference target value of the EGR rate is used as the virtual current value of the EGR rate, and a curve (curve denoted by "after modification") that illustrates changes in the future value of the condensed water amount in a case where the modified target value of the EGR rate is used as the virtual current value of the EGR rate are depicted. As shown in the graph, by appropriately modifying the virtual current value of the EGR rate, a future value of the condensed water amount can be changed so as to satisfy the constraint. The target EGR rate modification unit 200 searches for a virtual current value of the EGR rate such that the future value of the condensed water amount does not conflict with the constraint in a state in which the internal combustion engine is stopped, that is, the ideal current value of the EGR rate, and modifies the target value of the EGR rate to the ideal current value. Thereby, even if the internal combustion engine suddenly stops, a situation in which the amount of condensed water generated inside the cylinders accompanying such stopping conflicts with the constraint is avoided.

Embodiment 3

Next, Embodiment 3 of the present invention will be described using the drawings.

<Control Object of Embodiment 3>

A control device of Embodiment 3 is a control device that takes an automobile equipped with a following distance control system as a control object. A following distance control system is configured to measure a following distance with respect to a preceding vehicle by means of millimeter-wave radar or a camera or the like, and to automatically perform throttle control or brake control in accordance with a change in the following distance. The control device of Embodiment 3 performs control of an automobile by taking a following distance with respect to a preceding vehicle as a controlled variable and taking a throttle opening degree and brake pressure as manipulated variables. Further, in an automobile equipped with a following distance control system, when the brakes are suddenly applied in a preceding vehicle, there is a concern that the following distance will rapidly narrow and cause the driver to experience a sense of fear. Therefore, in Embodiment 3, a constraint from the viewpoint of safety is imposed on the following distance. Specifically, a lower limit value that does not cause the driver to experience a sense of fear even if the brakes are suddenly applied in a preceding vehicle is set as a constraint with respect to the following distance. That is, in Embodiment 3, the following distance with respect to the preceding vehicle corresponds to a specific state quantity on which a constraint is imposed. Further, in Embodiment 3, an operating condition at a time when sudden braking is performed in the preceding vehicle corresponds to a specific operating condition.

<Control Structure of Embodiment 3>

Figure 12:
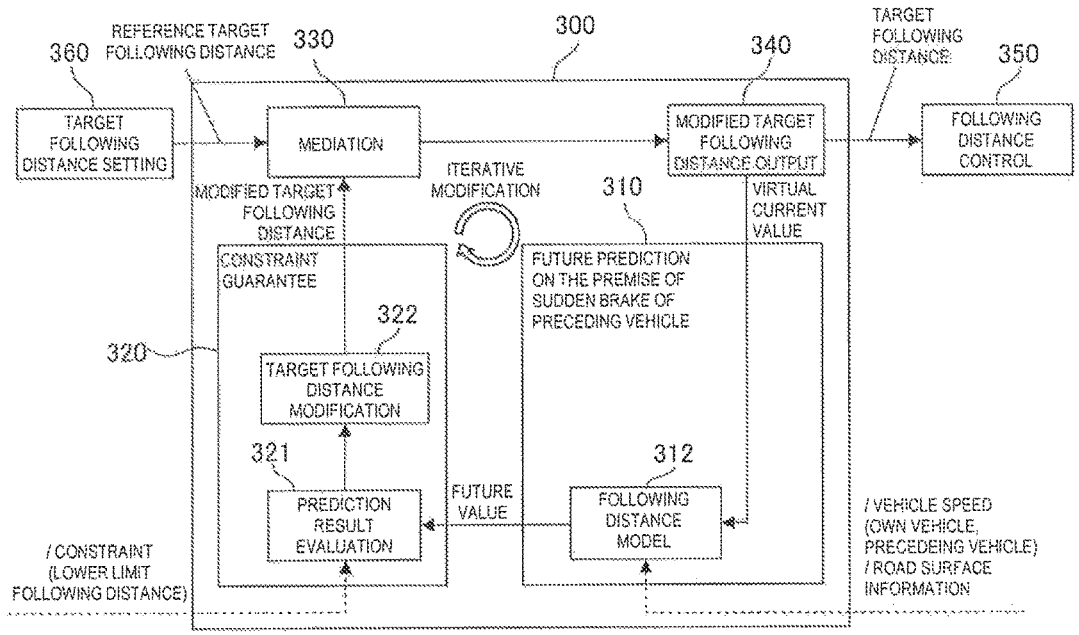
FIG. 12 is a block diagram illustrating a control structure of Embodiment 3 of the present invention.

FIG. 12 is a block diagram illustrating the control structure of the control device of Embodiment 3. The control structure illustrated in FIG. 12 includes a target following distance setting unit 360, a target following distance modification unit 300, and a following distance control unit 350. The target following distance setting unit 360 sets a target value of the following distance based on operating conditions such as the speed of its own vehicle and the speed of the preceding vehicle. The target following distance modification unit 300 modifies the target value of the following distance which is set by the target following distance setting unit 360, so that the following distance does not conflict with the constraint even if the brakes are suddenly applied in the preceding vehicle. Specifically, the target following distance modification unit 300 includes a future prediction unit 310, a constraint guarantee unit 320, a mediation unit 330 and a modified target following distance output unit 340. Based on the target value of the following distance that was modified by the target following distance modification unit 300, the following distance control unit 350 controls the throttle or brakes so that the actual following distance becomes the target value. These units that the control device includes correspond to a control program that is stored in a memory of the control device, or to one portion of the control program. The functions of these units are realized by the control device reading out the control program from the memory and executing the control program with a processor.

The details of the target following distance modification unit 300 will now be described. The future prediction unit 310 constituting one part of the target following distance modification unit 300 includes a following distance model 312. The following distance model 312 is a model that predicts a future value of a following distance that will be realized by following distance control. The speed of its own vehicle and the speed of the preceding vehicle are used as parameters in the following distance model 312. Furthermore, in a case where road surface information (for example, information regarding dryness, wetting, freezing or the like) can be received from a road traffic information system, the road surface information can also be used as a parameter. The future prediction unit 310 performs future prediction with respect to the following distance by means of the following distance model 312, on the premise of an operating condition such that the brakes will be suddenly applied in the preceding vehicle in the next moment. Sudden application of the brakes in the preceding vehicle is a particularly difficult operating condition in terms of satisfying the constraint imposed on the following distance, and at the same time is also an operating condition which is required to satisfy the constraint with a particularly high degree of accuracy in terms of safety. According to the following distance control, upon detecting sudden braking of the preceding vehicle, the brakes are also applied suddenly in the vehicle in which the control device is mounted to thereby avoid a collision. According to the following distance model 312, a change in the following distance in a case where the following distance control operated in this way is predicted by taking a current value of the following distance as an initial value. However, the current value of the following distance that is input to the following distance model 312 is not an actual current value measured by millimeter-wave radar or the like. The future prediction unit 310 receives a target value (or modified target value) of the following distance from the modified target following distance output unit 340, and provides the target value (or modified target value) to the following distance model 312 as a virtual current value of the following distance. The following distance model 312 calculates a future value of the following distance over a predetermined prediction horizon by taking the virtual current value of the following distance as an initial value.

The constraint guarantee unit 320 includes a prediction result evaluation unit 321 and a target value modification unit 322. The prediction result evaluation unit 321 performs an evaluation with respect to the future value of the following distance that is calculated by the future prediction unit 310, by checking the future value against a lower limit value of the following distance that is the constraint. Based on the evaluation result with respect to the future value of the following distance, the target value modification unit 322 modifies the target value of the following distance so that a higher evaluation is obtained. In this case, the target value of the following distance that is modified is a target value that is used as the virtual current value of the following distance in the following distance model 312. Hence, modification of the target value by the target value modification unit 322 means modification of the virtual current value of the following distance.

When a target value of the following distance (hereunder, referred to as "reference target value") is input from the target following distance setting unit 360, the mediation unit 330 outputs the reference target value to the modified target following distance output unit 340. Further, when a modified target value of the following distance is input from the constraint guarantee unit 320, the mediation unit 330 outputs the modified target value to the modified target following distance output unit 340 instead of the reference target value. The modified target following distance output unit 340 determines whether or not modification of the target value of the following distance is completed, and outputs the target value or the modified target value of the following distance as the virtual current value of the following distance to the future prediction unit 310 until modification is completed.

The target following distance modification unit 300 iteratively modifies the target following distance by calculating the loop formed by the modified target following distance output unit 340, the future prediction unit 310, the constraint guarantee unit 320 and the mediation unit 330, and thereby searches for a virtual current value of the following distance which can satisfy the constraint. Subsequently, a virtual current value of the following distance which can satisfy the constraint is output as a target value of the following distance from the target following distance modification unit 300 to the following distance control unit 350.

<Example of Calculation by Control Structure of Embodiment 3>

Figure 13:
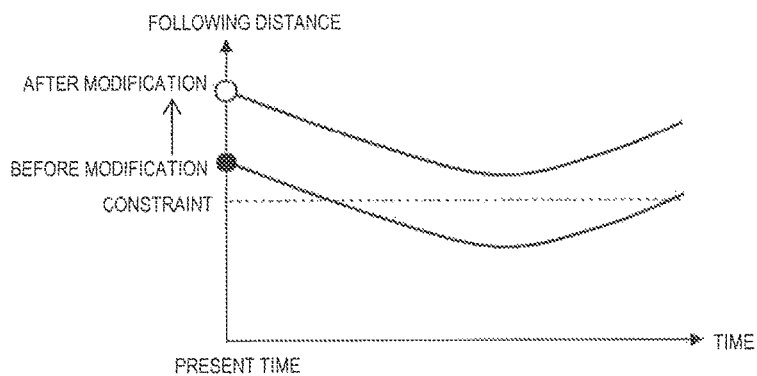
FIG. 13 is a view illustrating an example of a calculation by the control structure of Embodiment 3 of the present invention.

FIG. 13 illustrates a graph in which, taking the time axis as the abscissa axis, future values of the following distance that are predicted using the following distance model 312 are shown. In this graph, a curve (curve denoted by "before modification") that illustrates changes in the future value of the following distance in a case where the reference target value is used as the virtual current value of the following distance, and a curve (curve denoted by "after modification") that illustrates changes in the future value of the following distance in a case where the modified target value is used as the virtual current value of the following distance are depicted. As shown in the graph, by appropriately modifying the virtual current value of the following distance, a future value of the following distance can be changed so as to satisfy the constraint. The target following distance modification unit 300 searches for a virtual current value of the following distance which is a value such that a future value of the following distance in a case where brakes are suddenly applied in a preceding vehicle does not conflict with the constraint, that is, searches for the ideal current value of the following distance, and modifies the target value of the following distance to the ideal current value. Thereby, even if brakes are suddenly applied in the preceding vehicle, a situation in which the following distance rapidly shortens and conflicts with the constraint is avoided.

Embodiment 4

Next, Embodiment 4 of the present invention will be described using the drawings.

<Control Object of Embodiment 4>

A control device of Embodiment 4 is a control device that takes an internal combustion engine with a turbocharger that is mounted in an automobile as a control object. The internal combustion engine may be a spark-ignition internal combustion engine or may be a compression self-ignition internal combustion engine. The control device of Embodiment 4 performs control of the internal combustion engine by taking an air amount (fresh air amount) that is drawn into cylinders of the internal combustion engine as a controlled variable, and taking control variables of air system actuators including a throttle valve as manipulated variables. In addition to the throttle valve, a waste gate valve, an EGR valve and a variable valve timing mechanism and the like are also included in the air system actuators. In an internal combustion engine with a turbocharger, even when a driver fully depresses an accelerator pedal to request acceleration, unless there is a sufficient amount of air at the time point at which the acceleration request is made, a delay will arise before the turbine speed increases. A delay in an increase in the turbine speed produces an acceleration lag, which causes stress for the driver. Therefore, in Embodiment 4, a constraint from the viewpoint of drivability is imposed with respect to a rate of change of acceleration that acts on a vehicle. Specifically, a lower limit value of a rate of change of acceleration that does not cause stress for a driver is set as a constraint with respect to the rate of change of acceleration. That is, in Embodiment 4, a rate of change of acceleration of an automobile corresponds to a specific state quantity on which a constraint is imposed. Further, in Embodiment 4, an operating condition when the internal combustion engine is in a state of full acceleration corresponds to a specific operating condition.

<Control Structure of Embodiment 4>

Figure 14:
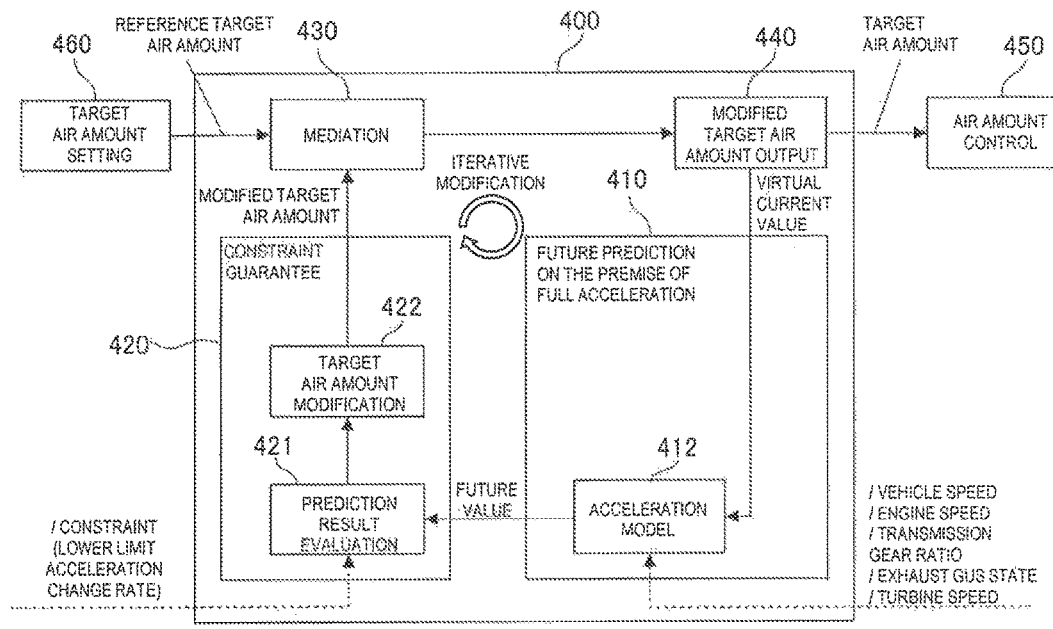
FIG. 14 is a block diagram illustrating a control structure of Embodiment 4 of the present invention.

FIG. 14 is a block diagram illustrating a control structure of the control device of Embodiment 4. The control structure illustrated in FIG. 14 includes a target air amount setting unit 460, a target air amount modification unit 400 and an air amount control unit 450. The target air amount setting unit 460 sets a target value of an air amount based on operating conditions such as the engine speed and the accelerator opening degree. The target air amount modification unit 400 modifies the target value of the air amount that is set by the target air amount setting unit 460 so that the rate of change of acceleration does not conflict with the constraint. Specifically, the target air amount modification unit 400 includes a future prediction unit 410, a constraint guarantee unit 420, a mediation unit 430 and a modified target air amount output unit 440. Based on a target value of the air amount that was modified by the target air amount modification unit 400, the air amount control unit 450 controls air system actuators so that the actual air amount becomes the target value. These units that the control device includes correspond to a control program that is stored in a memory of the control device, or to one portion of the control program. The functions of these units are realized by the control device reading out the control program from the memory and executing the control program with a processor.

The details of the target air amount modification unit 400 will now be described. The future prediction unit 410 constituting a part of the target air amount modification unit 400 includes an acceleration model 412. The acceleration model 412 is a model in which the relation between an air amount and an acceleration that acts on a vehicle is modelled using a physical model or the like. The relation between an air amount and an acceleration in an internal combustion engine with a turbocharger is influenced by parameters such as the vehicle speed, the engine speed, the transmission gear ratio of the transmission, the exhaust gas state (temperature, flow rate and the like) and the turbine speed. Therefore, these parameters are also taken into consideration in future prediction by the acceleration model 412. Note that although it is possible to measure the air amount using an air flow meter, the future prediction unit 410 receives a target value (or modified target value) of the air amount from the modified target air amount output unit 440, and applies the target value (or modified target value) as a virtual current value of the air amount to the acceleration model 412. On the premise of full acceleration in which the accelerator pedal is fully depressed, the acceleration model 412 calculates a future value of acceleration over a predetermined prediction horizon based on various parameters including the virtual current value of the air amount. Full acceleration in which the accelerator pedal is fully depressed in accordance with the intention of the driver is an operating condition for which, from the viewpoint of drivability, it is required to satisfy the constraint with respect to a rate of change of acceleration with a particularly high degree of accuracy.

The constraint guarantee unit 420 includes a prediction result evaluation unit 421 and a target value modification unit 422. The prediction result evaluation unit 421 calculates a rate of change of acceleration in a prediction interval based on a future value of acceleration that was calculated by the future prediction unit 410. The prediction result evaluation unit 421 then performs an evaluation by checking the rate of change of acceleration against the lower limit value that is the constraint. Based on the evaluation result with respect to the rate of change of acceleration, the target value modification unit 422 modifies the target value of the air amount so that a higher evaluation is obtained. In this case, the target value of the air amount that is modified is a target value that is used as the virtual current value of the air amount in the acceleration model 412. Hence, modification of the target value by the target value modification unit 422 means modification of the virtual current value of the air amount.

When a target value of the air amount (hereunder, referred to as "reference target value") is input from the target air amount setting unit 460, the mediation unit 430 outputs the reference target value to the modified target air amount output unit 440. Further, when a modified target value of the air amount is input from the constraint guarantee unit 420, the mediation unit 430 outputs the modified target value to the modified target air amount output unit 440 instead of the reference target value. The modified target air amount output unit 440 determines whether or not modification of the target value of the air amount is completed, and outputs the target value or the modified target value of the air amount as the virtual current value of the air amount to the future prediction unit 410 until modification is completed.

The target air amount modification unit 400 iteratively modifies the target air amount by calculating the loop formed by the modified target air amount output unit 440, the future prediction unit 410, the constraint guarantee unit 420 and the mediation unit 430, and thereby searches for a virtual current value of the air amount at which the constraint imposed on the rate of change of acceleration can be satisfied. Subsequently, a virtual current value of the air amount at which the constraint imposed on the rate of change of acceleration can be satisfied is output as a target value of the air amount from the target air amount modification unit 400 to the air amount control unit 450.

<Example of Calculation by Control Structure of Embodiment 4>

Figure 15:
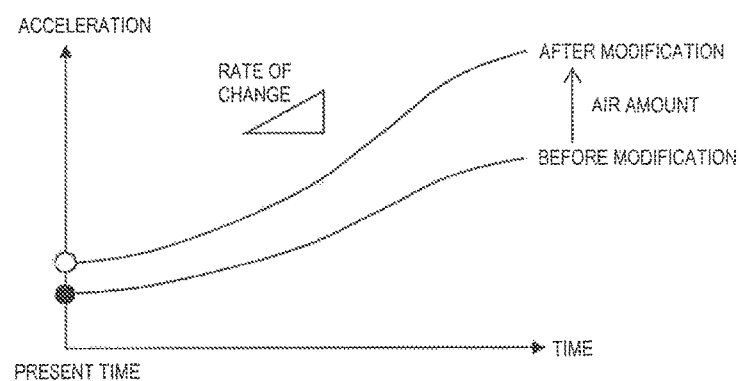
FIG. 15 is a view illustrating an example of a calculation by the control structure of Embodiment 4 of the present invention.

FIG. 15 illustrates a graph in which, taking the time axis as the abscissa axis, future values of acceleration that are predicted using the acceleration model 412 are shown. In this graph, a curve (curve denoted by "before modification") that illustrates changes in future values of acceleration in a case where the reference target value is used as the virtual current value of the air amount, and a curve (curve denoted by "after modification") that illustrates changes in future values of acceleration in a case where the modified target value is used as the virtual current value of the air amount are depicted. As shown in the graph, by appropriately modifying the virtual current value of the air amount, a future value of the acceleration can be changed so that the rate of change of acceleration satisfies the constraint. The target air amount modification unit 400 searches for a virtual current value of the air amount for satisfying the constraint in a state of full acceleration, that is, the ideal current value of the air amount, and modifies the target value of the air amount to the ideal current value. Thereby, even if the accelerator pedal is suddenly depressed fully, an acceleration lag that causes stress for the driver is avoided.

Other Embodiments

The control device according to the present invention can also take as a control object an internal combustion engine equipped with an LPL-EGR system in which a region downstream of a turbine and a region upstream of a compressor are connected with an EGR passage. Is such an internal combustion engine there is a problem that, at a time of acceleration, a lag arises with regard to a change in an in-cylinder air amount (fresh air amount) accompanying a lag in cutting off EGR gas. Therefore, in this case, an ideal current value of the EGR gas amount is searched for by future prediction using a model that takes the EGR gas amount as a controlled variable, and takes the air amount as a specific state quantity on which a constraint is imposed. By controlling the LPL-EGR system by taking the ideal current value of the EGR gas amount obtained in this manner as the target value of the EGR gas amount, a response delay with respect to the air amount at a time of acceleration can be prevented.

Although several embodiments of the present invention have been introduced in the foregoing, the present invention is not limited to these embodiments. Various modifications can be made to the above described embodiments, as long as such modifications are within a range that does not depart from the gist of the present invention. For example, although in the above described embodiments an optimal target value is searched for by iterative modification, it is also possible to adopt another search method. Taking Embodiment 1 as an example, a following search method may be adopted. A plurality of virtual current values that are centered on the reference target value or actual current value of the DPF temperature are determined, and future prediction of the DPF temperature is performed by taking each of the plurality of virtual current values as an initial value. Subsequently, virtual current values for which a future value of the DPF temperature did not conflict with the constraint are selected from among the plurality of virtual current values, and furthermore, from among the selected virtual current values, a virtual current value that is closest to the reference target value is determined as the target value of the DPF temperature.

DESCRIPTION OF REFERENCE NUMERALS

6 Exhaust passage
12 DPF
14 Fuel addition valve
16 Temperature sensor
20 ECU
100 Target temperature modification unit
112 DPF temperature model
150 Addition amount control unit
160 Target temperature setting unit
200 Target EGR rate modification unit
212 Condensed water amount model
250 EGR control unit
260 Target EGR rate setting unit
300 Target following distance modification unit
312 Following distance model
350 Following distance control unit
360 Target following distance setting unit
400 Target air amount modification unit
412 Acceleration model
450 Air amount control unit
460 Target air amount setting unit
800 Reference governor

The invention claimed is:

1. A control device that controls a plant in which a constraint is imposed on a specific state quantity, the control device comprising:
 a prediction model of which inputs include an operating condition and a controlled variable of the plant, and of which outputs include a future value of the specific state quantity that is predicted based on the inputs;
 the control device being configured to:
 on a premise that an operating condition of the plant is a specific operating condition that is previously defined, search for a virtual current value of the controlled variable for ensuring that the specific state quantity does not conflict with the constraint in future, using the prediction model;

set the virtual current value that is obtained by searching as a target value of the controlled variable; and determine a manipulated variable of the plant so that an actual current value of the controlled variable approaches the target value.

2. The control device according to claim 1, wherein the control device is configured to:

determine a reference target value of the controlled variable based on current operating conditions of the plant, and perform a search for the virtual current value based on the reference target value.

3. The control device according to claim 2, wherein the control device is configured to execute:

when performing the search for the virtual current value based on the reference target value, a first processing that initially sets the reference target value as the virtual current value;

a second processing that predicts a future value of the specific state quantity by means of the prediction model using the virtual current value as a parameter;

a third processing that, based on the future value of the specific state quantity that is predicted by the second processing and the constraint, calculates an evaluation value of the virtual current value using an evaluation function that is previously defined; and a fourth processing that modifies the virtual current value based on the evaluation value that is calculated by the third processing; and to repeat the second processing, the third processing and the fourth processing a predetermined number of times.

4. The control device according to claim 1, wherein the controlled variable and the specific state quantity are a same kind of state quantity.

5. The control device according to claim 4, wherein:

the plant is an internal combustion engine that is equipped with a DPF in an exhaust passage;

the controlled variable and the specific state quantity are both a DPF temperature; and the specific operating condition is an operating condition at a time when the internal combustion engine is in an idle state.

6. The control device according to claim 4, wherein:

the plant is an automobile that is equipped with a following distance control system;

the controlled variable and the specific state quantity are both a following distance between the automobile and a preceding vehicle; and the specific operating condition is an operating condition at a time when sudden braking is performed in the preceding vehicle.

7. The control device according to claim 1, wherein the controlled variable and the specific state quantity are different kinds of state quantities.

8. The control device according to claim 7, wherein:

the plant is an internal combustion engine that is equipped with an EGR system;

the controlled variable is an EGR rate;

the specific state quantity is an amount of condensed water that is generated inside a cylinder; and the specific operating condition is an operating condition at a time when the internal combustion engine is in a stopped state.

9. The control device according to claim 7, wherein:

the plant is an internal combustion engine with a turbocharger that is mounted in an automobile;

the controlled variable is an air amount that is drawn into a cylinder of the internal combustion engine;

the specific state quantity is a rate of change of acceleration of the automobile; and the specific operating condition is an operating condition at a time when the internal combustion engine is in a state of full acceleration.

* * * * *